(12) United States Patent
van Bebber et al.

(10) Patent No.: US 11,022,015 B2
(45) Date of Patent: Jun. 1, 2021

(54) METHODS AND SYSTEMS FOR AN EXHAUST GAS AFTERTREATMENT DEVICE

(71) Applicant: Ford Global Technologies, LLC, Dearborn, MI (US)

(72) Inventors: David van Bebber, Aachen (DE); Hans Guenter Quix, Herzogenrath (DE); Claudia Katharina Herudek, Aachen (DE); Andreas Schmitt, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 15/880,831

(22) Filed: Jan. 26, 2018

(65) Prior Publication Data
US 2018/0238219 A1    Aug. 23, 2018

(30) Foreign Application Priority Data

Feb. 17, 2017   (DE) .......................... 102017202574.3

(51) Int. Cl.
*F01N 3/20*     (2006.01)
*F02D 41/02*    (2006.01)
(Continued)

(52) U.S. Cl.
CPC ....... *F01N 3/2073* (2013.01); *B01D 53/9409* (2013.01); *B01D 53/9418* (2013.01);
(Continued)

(58) Field of Classification Search
CPC ........ B01D 2251/2062; B01D 53/9409; B01D 53/9418; B01D 53/9495; F01N 2240/25; F01N 2610/02; F01N 2610/1406; F01N 3/2073; F02D 37/02; F02D 41/0007; F02D 41/0235; F02D 41/024; F02D 41/1446; F02D 41/1448; F02D 9/04; Y02A 50/2325; Y02C 20/10; Y02T 10/26; Y10S 903/904

See application file for complete search history.

(56) References Cited

U.S. PATENT DOCUMENTS 7,708,966 B2 * 5/2010 Joshi ...................... B01D 53/90
                                                          422/148
8,916,123 B2   12/2014 Joshi et al.
(Continued)

FOREIGN PATENT DOCUMENTS

DE       102014204307 A1    9/2014

OTHER PUBLICATIONS

Licht, S. et al., "Ammonia synthesis by N2 and steam electrolysis in molten hydroxide suspensions of nanoscale Fe2O3," Science, vol. 345, No. 6197, Aug. 8, 2014, 5 pages.
(Continued)

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for an exhaust gas aftertreatment device. In one example, a method may include adjusting one or more engine operating parameters to produce ammonia in an ammonia generating device in response to an ammonia demand.

19 Claims, 3 Drawing Sheets

(51) Int. Cl.
*B01D 53/94* (2006.01)
*F02D 37/02* (2006.01)
*F02D 41/14* (2006.01)
*F02D 9/04* (2006.01)
*F02D 41/00* (2006.01)

(52) U.S. Cl.
CPC ....... *B01D 53/9495* (2013.01); *F02D 41/024* (2013.01); *F02D 41/0235* (2013.01); *B01D 2251/2062* (2013.01); *F01N 2240/25* (2013.01); *F01N 2610/02* (2013.01); *F01N 2610/1406* (2013.01); *F02D 9/04* (2013.01); *F02D 37/02* (2013.01); *F02D 41/0007* (2013.01); *F02D 41/1446* (2013.01); *F02D 41/1448* (2013.01); *Y02A 50/20* (2018.01); *Y02C 20/10* (2013.01); *Y02T 10/12* (2013.01); *Y10S 903/904* (2013.01)

(56) References Cited

U.S. PATENT DOCUMENTS

| | | | |
|---|---|---|---|
| 9,217,347 B2 | 12/2015 | Englert et al. | |
| 9,790,830 B2 | 10/2017 | Sun | |
| 9,970,343 B2* | 5/2018 | Kato | F01N 3/2073 |
| 2005/0025692 A1* | 2/2005 | Becher | B01D 53/90 |
| | | | 423/359 |
| 2008/0286165 A1* | 11/2008 | Graupner | C01B 3/047 |
| | | | 422/148 |
| 2010/0183497 A1* | 7/2010 | Carpenter | B01J 23/745 |
| | | | 423/352 |
| 2011/0243823 A1* | 10/2011 | Botte | C25B 1/00 |
| | | | 423/235 |
| 2017/0204762 A1 | 7/2017 | Kotrba et al. | |

OTHER PUBLICATIONS

Li, F. et al., "Advances in Understanding the Mechanism and Improved Stability of the Synthesis of Ammonia from Air and Water in Hydroxide Suspensions of Nanoscale Fe2O3," Inorganic Chemistry, vol. 53, No. 19, Sep. 23, 2014, 3 pages.

Nguyen, M. et al., "Nitrogen electrochemically reduced to ammonia with hematite: density-functional insights," Physical Chemistry Chemical Physics, vol. 17, No. 22, Jun. 14, 2015, Published Online Nov. 28, 2014, 6 pages.

Renner, J. et al., "Electrochemical Synthesis of Ammonia: A Low Pressure, Low Temperature Approach," The Electrochemical Society Interface, vol. 24, No. 2, Jun. 2015, 7 pages.

Sheets, B. et al., "Electrochemical Ammonia Synthesis Under Ambient Conditions Using Alkaline Media," Meeting Abstract, Proceedings of the 229th ECS Meeting: Z05-Sustainable Materials and Manufacturing, May 29, 2016, San Diego, California, 2 pages.

Kyriakou, V. et al., "Progress in the Electrochemical Synthesis of Ammonia," Catalysis Today, vol. 286, May 15, 2017, Available Online Jun. 19, 2016, 12 pages.

* cited by examiner

METHODS AND SYSTEMS FOR AN EXHAUST GAS AFTERTREATMENT DEVICE

CROSS REFERENCE TO RELATED APPLICATION

This application claims priority to German Patent Application No. 102017202574.3, filed Feb. 17, 2017. The entire contents of the above-referenced application are hereby incorporated by reference in their entirety for all purposes.

FIELD

The present description relates generally to catalytically producing ammonia via an ammonia generating device coupled to an exhaust gas aftertreatment device.

BACKGROUND/SUMMARY

Selective catalytic reduction (SCR) devices may be used to reduce vehicle $NO_x$ output. SCR devices may comprise one or more catalytically active components dispersed therein, wherein the catalytically active components may be reduced to a more catalytically active state via introduction of a reductant.

Injectors may inject urea, fuel, or other similar compounds into an exhaust gas stream to react with surfaces of the SCR. For example, an injector may inject urea into the exhaust gas stream, wherein the urea is broken down into ammonia, the ammonia gas flowing to and reacting with surfaces of the SCR.

However, injection of reductants into the exhaust gas may be relatively inefficient. For example, decomposition of urea into ammonia may be temperature sensitive, wherein if the decomposition may decrease as exhaust gas temperatures decreases. Additionally, distribution of reductant injections may be uneven due to low exhaust gas turbulence, thereby resulting in uneven reduction of SCR device surfaces. Furthermore, reductant injection systems may utilize a reductant reservoir which is not self-replenishing, thereby forcing a vehicle operator to periodically replenish the reductant reservoir.

In one example, the issues described above may be addressed by a method comprising adjusting one or more engine operating parameters to adjust a current exhaust gas temperature and pressure to a desired exhaust gas temperature and pressure to catalytically produce ammonia in an ammonia generating device in response to an ammonia demand. In this way, ammonia may be generated without urea or other As one example, the ammonia demand is from one or more of a SCR device and a reservoir, wherein each of the SCR device and the reservoir are fluidly coupled to the ammonia generating device. The reservoir may direct ammonia to the SCR device when conditions for generating ammonia in the ammonia generating device are not met. Fuel economy may be deliberately reduced when engine operating parameters are adjusted to increase exhaust gas temperature, where the adjusting includes adjusting one or more of a spark timing or fuel injection timing, a fuel injection pressure, a fuel injection volume, a wastegate position, a backpressure valve position, and an amount of condensate swept to the engine.

The ammonia generating device may be arranged to receive energy from the exhaust gas passage. This may include a duct or similar connection leading from the engine, exhaust passage, and/or heat transfer device such that energy (e.g., heat) from exhaust gas may be transferred to the ammonia generating device. The ammonia generating device may be electrically coupled to an energy storage device to receive between 1 to 5 V when ammonia production is desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
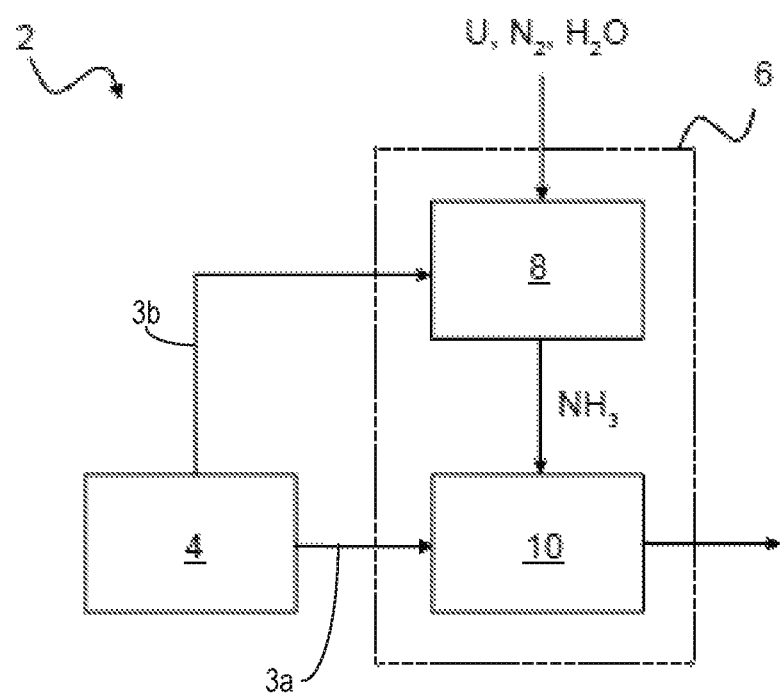
FIG. 1 shows an internal combustion engine and an exhaust gas aftertreatment device of a motor vehicle for implementing an exemplary embodiment of the method according to the invention.
Figure 2:
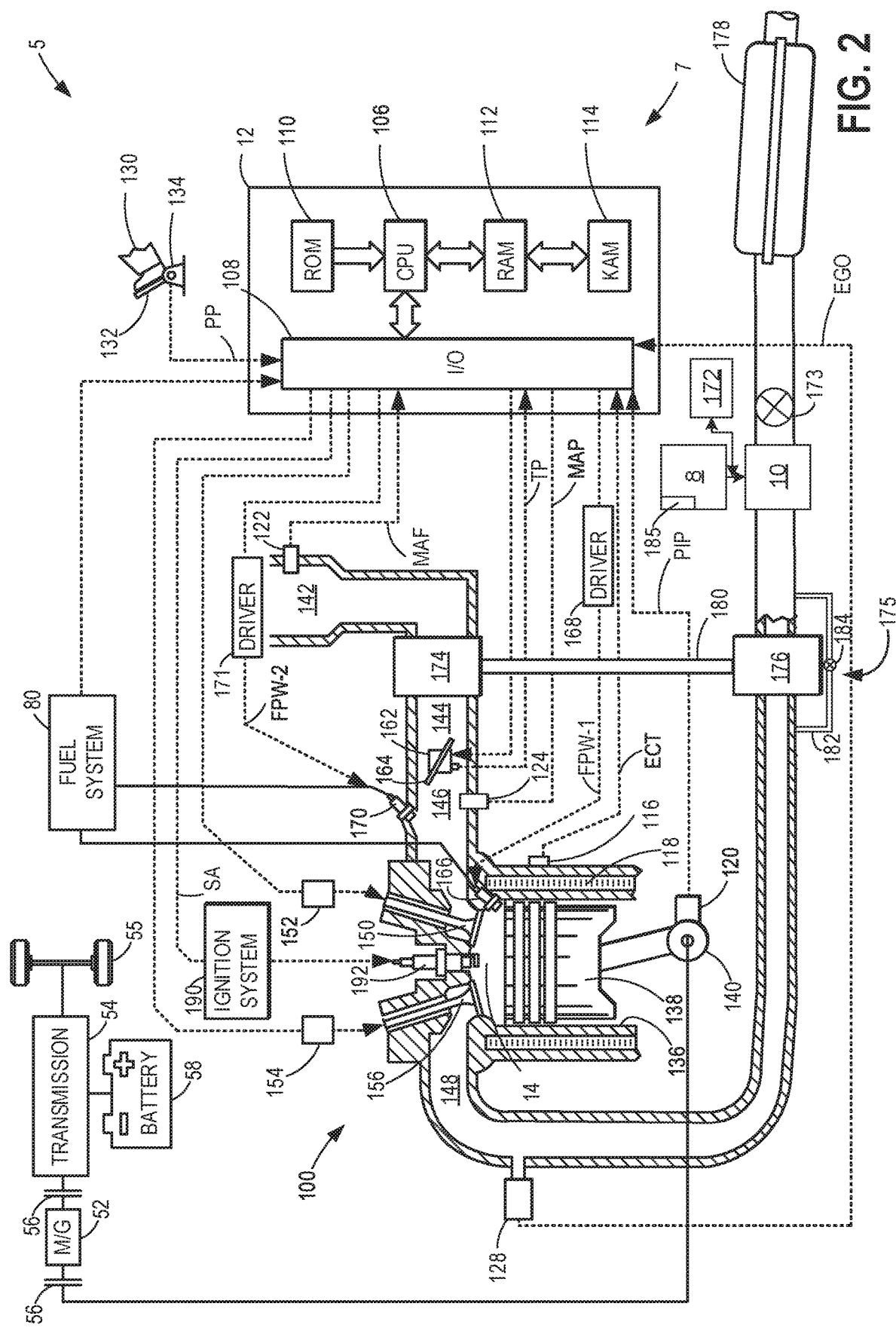
FIG. 2 shows an engine schematic of a hybrid vehicle
Figure 3:
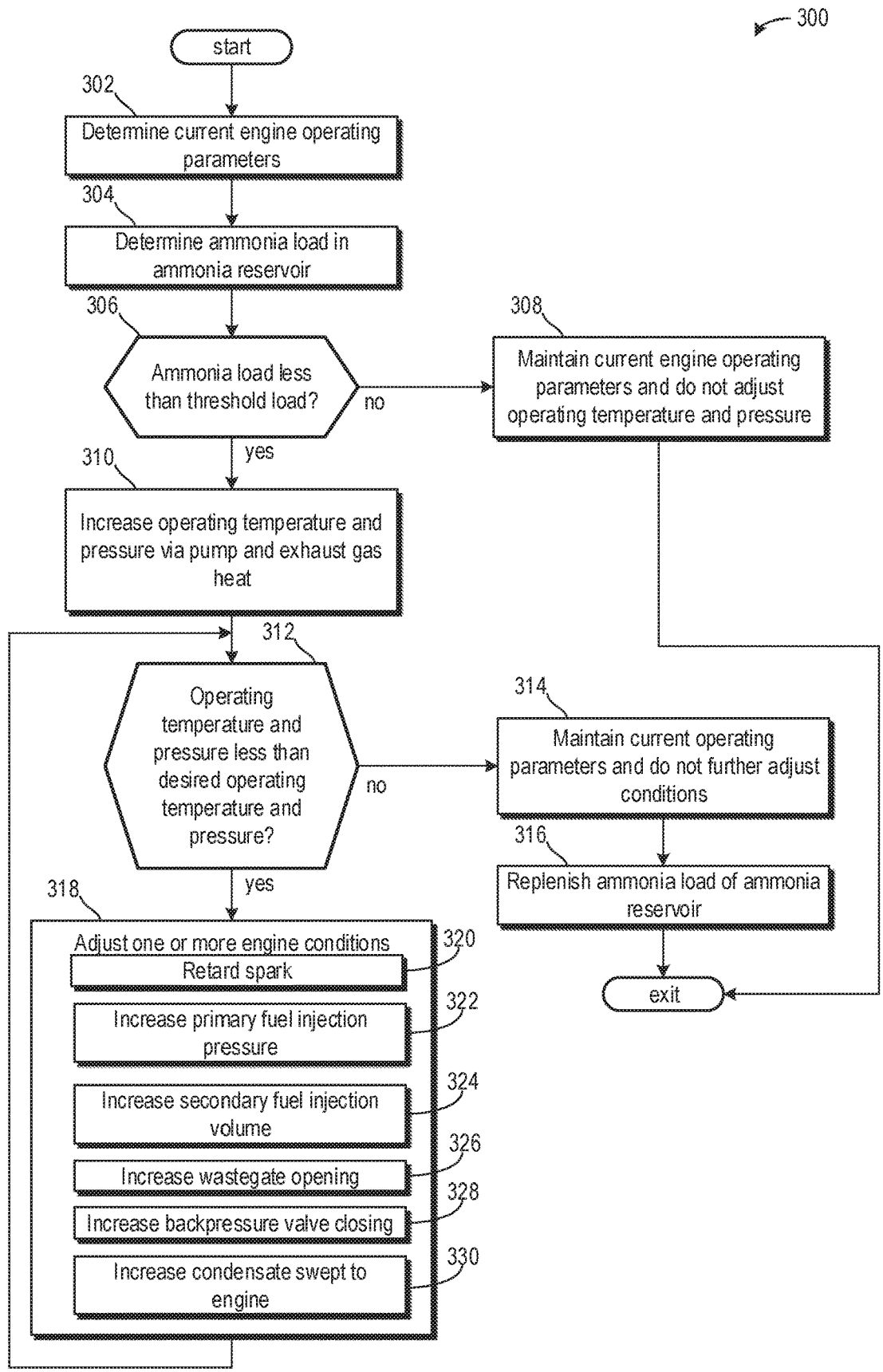
FIG. 3 shows a method for adjusting one or more operating parameters to produce ammonia in the ammonia generating device.

The following description relates to systems and methods for producing ammonia in an ammonia generating device for providing ammonia to one or more of a selective catalytic reduction SCR device and a reservoir. FIG. 1 illustrates a relationship between an engine, the SCR device, and the ammonia generating device, wherein the SCR device is arranged along an exhaust passage. FIG. 2 illustrates an engine schematic of an engine arranged in a hybrid vehicle. The engine is coupled to an exhaust passage comprising an SCR device. FIG. 3 illustrates a method for adjusting one or more engine operating parameters to generate increased exhaust gas temperatures improving ammonia producing conditions not being met in the presence of an ammonia demand.

Exhaust gas aftertreatment devices may serve for the scrubbing of exhaust gases or combustion gases of internal combustion engines which drive motor vehicles as a traction engine in order to be able to observe pollutant limits.

Nitrogen oxides can be reduced from the exhaust gas by means of selective catalytic reduction (SCR). The chemical reaction at an SCR catalyst of such an exhaust gas aftertreatment device may be selective so that the reduction of nitrogen oxides is prioritized, whereas unwanted secondary reactions, such as the oxidation of sulfur dioxide to sulfur trioxide, are eliminated. Ammonia, which is admixed with the exhaust gas, is desired for the reaction. The products of the reaction are water and nitrogen. In the case of the reaction it is a comproportionation of the nitrogen oxides with ammonia to form nitrogen.

An aqueous urea solution, such as AdBlue, from which ammonia is produced by means of hydrolysis during further transportation through the exhaust gas pipe, is injected into exhaust gas aftertreatment devices of motor vehicles. However, for storing the urea solution there is a demand for a fluid tank which increases packaging constraints in the motor vehicle. Furthermore, the fluid tank may demand periodic refilling, which may present a nuisance to a vehicle operator.

Producing ammonia by means of the Haber-Bosch process demands an operating pressure of between 300 bar and 500 bar and temperatures of between 400° C. and 500° C. Such operating pressures and temperatures, however, may not be provided through a plurality of engine operating conditions.

Therefore, there may exist a demand for demonstrating ways in which ammonia for an exhaust gas aftertreatment device can be produced in a motor vehicle.

The object of the present disclosure is achieved by a method for operating an exhaust gas aftertreatment device for the scrubbing of exhaust gas of an internal combustion engine of a motor vehicle, in which ammonia is used for the selective catalytic reduction of nitrogen oxides in the exhaust gas, wherein the ammonia is produced by means of electrolysis, wherein nanoparticles of iron(III) oxide, which are distributed in a mixture consisting of potassium hydroxide and sodium hydroxide, are used as the catalyst, an electric DC voltage of between 1 V and 48 V, is used for the electrolysis, and wherein the electrolysis is carried out at an operating temperature of between 150° C. and 450° C., and at an operating pressure of between 5 bar and 50 bar. Water is used as the hydrogen source. An equimolar mixture consisting of sodium hydroxide and potassium hydroxide is heated to between 150° C. and 450° C., so that a molten salt is produced. Small nanoparticles of iron(III) oxide of approximately 40 millionths of a millimeter are distributed in the molten salt and act as the catalyst. The operating temperature is between 200 to 250° C. in some embodiments. Additionally or alternatively, the electric DC voltage is between 1 and 2 V. Additionally or alternatively, the operating pressure is between 10 and 30 bar, in some embodiments. Additionally or alternatively, the operating pressure is between 20 and 25 bar.

Via two electrodes, this mixture is subjected to an electric DC voltage of between 1 V and 48 V. If water vapor and air flow through this electrochemical cell, the water molecules split into oxygen and hydrogen. Catalytically aided, the hydrogen combines with the atmospheric nitrogen of the air and ammonia is produced. Ammonia can thereby be provided for an exhaust gas aftertreatment device at considerably lower temperatures and pressures. Therefore, no storage of a urea solution in a fluid tank is demanded. Thus, packaging constraints are reduced and replenishment of the fluid tank is no longer needed.

According to one embodiment, waste heat of the internal combustion engine may be used for heating up to the operating temperature. To this end, for example thermal energy of the exhaust gases of the internal combustion engine is used, or provision is made for a connection to a cooler of a cooling circuit for the cooling of the internal combustion engine. No heat source, such as a heater, is thereby demanded and no additional energy for heating is consumed either, which increases energy efficiency and fuel economy.

According to a further embodiment, waste heat of the internal combustion engine may be used to create the operating pressure. For this purpose also, for example thermal energy of the exhaust gases of the internal combustion engine can be used or provision is made for a connection to a cooler of a cooling circuit for cooling the internal combustion engine. By means of the waste heat, for example water vapor can be produced in order to thereby provide the operating pressure. The energy efficiency is also increased in this way.

According to a further embodiment, a pump may create the operating pressure. The pump may increase the pressure provided by using waste heat to reach a desired operating pressure.

According to a further embodiment, electric energy of an on-board electrical system of the motor vehicle is used in order to provide the electric DC voltage. In this way, a separate voltage supply is not desired. Furthermore, for example braking energy recovered by recuperation, which is temporarily stored in electrical form, can therefore also be used. Also possible is a use of waste heat by means of a thermoelectric generator (TEG) to provide the electric DC voltage.

According to a further embodiment, water which has been obtained from water vapor from the exhaust gas of the internal combustion engine is used, and/or it is collected rain water or air moisture. Therefore, manual replenishing of a storage tank for supplying water can be dispensed.

According to a further embodiment, hydrogen, which is produced by the decomposition of water, is used for energy production. In this way, additional energy, for example electric energy, can be provided using a fuel cell which during normal operation and/or in the case of a boost operation with specific power peaks or requirements can be used.

FIG. 2 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows an internal combustion engine 4 and an exhaust gas aftertreatment device 6 of a motor vehicle 2.

The internal combustion engine 4 may be a diesel engine in the present exemplary embodiment. In some embodiments, the internal combustion engine 4 may be an Otto engine.

The exhaust gas aftertreatment device 6, which is connected downstream of the internal combustion engine 4 in an exhaust gas flow direction, has an SCR-catalyst 10 arranged along the exhaust passage 3a. The SCR-catalyst 10 may be configured to reduce nitrogen oxides (NOx) in the exhaust gas flow via selective catalytic reduction. In this case, the SCR-catalyst 10 utilizes ammonia (NH3) which is provided by a device 8 for producing said ammonia. In addition to the SCR-catalyst, the exhaust gas aftertreatment device 6 can have further components, such as 3-way catalysts and/or NOx storage catalysts. Furthermore, the exhaust gas aftertreatment device 6, deviating from the present exemplary embodiment, can also have more than one SCR-catalyst.

The device 8 may herein be interchangeably referred to as ammonia generating device 8. Device 8 may comprise an electrochemical cell in which an equimolar mixture consisting of potassium hydroxide (KOH) and sodium hydroxide (NaOH), for example with a mol-ratio of 0.5 NaOH/0.5 KOH, is provided as the catalyst and in which nanoparticles of iron(III) oxide (Fe2O3) with a size of approximately 40 millionth of a millimeter are distributed. The ammonia generating device may comprise Fe in the form of Fe2O3, Fe3O4, or FeO, additionally or alternatively. In some embodiments, additionally or alternatively, the ammonia generating device comprises a catalyst comprising Fe, Os, Ru, and Ur.

Furthermore, nitrogen ($N_2$), in the present exemplary embodiment atmospheric nitrogen from the ambient air, and water ($H_2O$), for example from a storage tank, can be fed to the device 8. The storage tank can be filled with water which is condensed water vapor from the exhaust gases or collected rain water or air moisture.

During operation, the mixture is heated up to an operating temperature of between 150° C. and 450° C., especially of between 200° C. and 250° C., and exposed to an electric DC voltage U of between 1 V and 48 V, especially of between 1 V and 10 V and more especially of between 1 V and 2 V, and also to a pressure of between 5 bar and 50 bar, especially of between 10 bar and 30 bar and more especially of between 20 bar and 25 bar. In the present exemplary embodiment, the operating temperature is 200° C. and the electric DC voltage U has a value of 1.2 volts. The pressure lies within the range of between 20 and 25 bar and the electric current density is 2 mA/cm2. With an operating temperature of 250° C. and a pressure of 25 bar, the electric DC voltage U, with a current density of 2 mA/cm2, is 1 V.

To heat up the mixture to the operating temperature, the device 8 in the present exemplary embodiment is connected to the internal combustion engine 4 in such a way that for example thermal energy of the exhaust gases of the internal combustion engine 4 can be used. As shown, the ammonia generating device 8 may be arranged along a secondary connection 3b. In the example of FIG. 1, the secondary connection 3b may allow heat from the engine 4 to be transferred to the ammonia generating device 8. That is to say, the ammonia generating device 8 may be thermally coupled to the engine 4 without receiving exhaust gas therefrom. Therefore, the ammonia generating device 8 may not be fluidly coupled to the engine 4. In such an example, air may be directed to the ammonia generating device 8 when ammonia generation is desired and/or when ammonia generating conditions are met. $N_2$ and water in the air may react in the presence of a catalyst of the ammonia generating device 8 to form ammonia.

In some embodiments, additionally or alternatively, a secondary connection may be fluidly coupled to a portion of the exhaust passage 3a upstream of the SCR-catalyst 10 or to the engine 4 such that exhaust gas may flow to the ammonia generating device 8. Alternatively, a connection to a cooler (e.g., a heat exchanger) of a cooling circuit for the cooling of the internal combustion engine 4 can be provided. For example, the device 8 may be an exhaust gas recirculation (EGR) cooler, charge-air-cooler (CAC), and the like. In this way, a valve may be arranged in the engine 4 and/or in the exhaust passage 3a, wherein the valve is configured to adjust exhaust gas flow to the ammonia generating device. In one example, the valve allows exhaust gas to flow to the ammonia generating device only in response to an ammonia demand from the SCR-catalyst 10 or an ammonia storage tank, as will be described in greater detail below.

The electric DC voltage U is provided in the present exemplary embodiment from an on-board electrical system of the motor vehicle 2. Alternatively, it can be provided that a thermoelectric generator also uses waste heat of the internal combustion engine 4 to provide the electric DC voltage U.

Also, to create the operating pressure waste heat of the internal combustion engine 4 is used in the present exemplary embodiment. In the present exemplary embodiment, water vapor is produced by the waste heat in order to thereby provide the operating pressure. For boosting, a pump may be used in combination with the waste heat (e.g., exhaust gas thermal energy) to increase a current pressure to a desired operating pressure.

During operation, water vapor and air flow through the electrochemical cell of the device 8. There, water is split into oxygen ($O_2$) and hydrogen ($H_2$). Catalytically aided, the hydrogen combines with the atmospheric nitrogen of the air and ammonia ($NH_3$) is produced.

In order to compensate demand peaks of ammonia and/or to release ammonia, which is not demanded in an unused state, ammonia is partially and temporarily stored. For this purpose, the device 8 may comprise the ammonia storage tank.

Therefore, ammonia can be provided for an exhaust gas aftertreatment device at considerably lower temperatures and pressures. As a result, there is no demand for storage of a urea solution in a fluid tank so that installation space is saved. Replenishing is also dispensed with.

FIG. 2 depicts an example of a cylinder of internal combustion engine 100 included by engine system 7 of vehicle 5. Engine 100 may be controlled at least partially by a control system including controller 12 and by input from a vehicle operator 130 via an input device 132. Engine 100 may be used similarly to engine 4 of FIG. 1. In this example, input device 132 includes an accelerator pedal and a pedal position sensor 134 for generating a proportional pedal position signal PP. Cylinder 14 (which may be referred to herein as a combustion chamber) of engine 100 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 100.

Cylinder 14 can receive intake air via a series of intake air passages 142, 144, and 146. Intake air passage 146 can communicate with other cylinders of engine 100 in addition to cylinder 14. FIG. 1 shows engine 100 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

The turbocharger 175 may further comprise a wastegate 184 arranged along bypass 182. When the wastegate 184 is in an at least partially open position, exhaust gas may flow around the turbine 176 and through the bypass 182. This may decrease boost provided to the engine 100 and increase exhaust pressure.

Exhaust passage 148 can receive exhaust gases from other cylinders of engine 100 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

In one example, the emission control device 178 is arranged in a far vehicle underbody. Comparatively, this location may be downstream of a close-coupled catalyst location, such as the location of first catalyst 184. In this way, the first catalyst 184 is arranged upstream of the emission control device 178. In one example, the first catalyst 184 may be a TWC, particulate filter (PF), $NO_x$ diesel oxidation catalyst, the like, or combinations thereof.

The SCR-catalyst 10 is shown arranged downstream of the turbine 176 and upstream of a backpressure valve 173 in the exhaust passage 148. In one example, the exhaust passage 148 is substantially similar to the exhaust passage 3a of FIG. 1. The SCR-catalyst is directly fluidly coupled to the ammonia generating device 8. The ammonia generating device 8 is arranged outside of the exhaust passage 148 and is configured to direct ammonia to each of the SCR-catalyst 10 and an ammonia reservoir 172. The ammonia generating device 8 may demand certain operating parameters (e.g., electrical power, temperature, and pressure) to increase exhaust gas temperature to improve ammonia production, as described above. To achieve the desired temperature and pressure one or more operating parameters may be adjusted to achieve the desired conditions. As an example, a pump 185 arranged in the ammonia generating device 8 may be activated to increase its pressure and temperature. Additionally or alternatively, the backpressure valve 173 may be moved to a more closed position to allow less exhaust gas to flow therethrough, thereby increasing a pressure of exhaust gas flowing to the ammonia generating device 8 via the secondary connection (e.g., secondary connection 3b of FIG. 1). Additional adjustments are described below.

Each cylinder of engine 100 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 100 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 100 may initiate combustion by auto-ignition or by injection of fuel as may be the case with some diesel engines.

In some examples, each cylinder of engine 100 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 80 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 80 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent and/or allow the least amount of air from the intake passage 146 to enter the cylinder 14 than any other position of the intake valve 150. Thus, the positions between the fully open and fully closed position may allow varying amounts of air to flow between the intake passage 146 to the cylinder 14. In one example, moving the intake valve 150 to a more open position allows more air to flow from the intake passage 146 to the cylinder 14 that its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 80 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 2 shows only one cylinder of a multi-cylinder engine. As such, each cylinder may similarly include its own set of intake/exhaust valves, fuel injector(s), spark plug, etc. It will be appreciated that engine 100 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 100 and an electric machine 52. Electric machine 52 may be a motor or a motor/generator. Crankshaft 140 of engine 100 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation. In one example, the battery 58 is electrically coupled to the ammonia generating device 8.

The controller 12 receives signals from the various sensors of FIG. 2 and employs the various actuators of FIG. 2 to adjust engine operation based on the received signals and instructions stored on a memory of the controller.

Turning now to FIG. 3, it shows a method 300 illustrating adjusting one or more engine operating parameters, if desired, to meet operating conditions for replenishing ammonia in a reservoir in response to the ammonia load being less than a threshold load. Instructions for carrying out method 300 may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

The method 300 begins at 302, where the method 300 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, boost pressure, and air/fuel ratio.

The method 300 may proceed to 304, where the method 300 may include determining an ammonia load in an ammonia reservoir (e.g. reservoir 172 of FIG. 2). In some embodiments, the ammonia load may be estimated based on feedback from a pressure sensor arranged in the reservoir. Additionally or alternatively, in some embodiments, the ammonia load may be estimated based on data stored in a multi-input look-up table, wherein the inputs may include two or more of ammonia produced by the device (e.g., device 8 of FIGS. 1 and 2), ammonia consumed by the SCR (e.g., SCR 10 of FIGS. 1 and 2), ammonia directed to the ammonia reservoir, ammonia consumed from the ammonia reservoir, and engine $NO_x$ output.

The method 300 may proceed to 306, where the method include determining if the ammonia load is less than a threshold load. The threshold load may be based on an amount of ammonia demanded by the SCR to reduce $NO_x$. In some embodiments, the threshold load may be adjusted based on an average amount of ammonia consumed to reduce engine $NO_x$. Additionally or alternatively, the threshold load may be adjusted based on an upcoming amount of engine $NO_x$ output. As an example, if the upcoming amount of engine $NO_x$ output is higher than a current amount of engine $NO_x$ output, then the threshold load may increase. Additionally or alternatively, in some embodiments, the threshold load may be based on an amount of ammonia consumed to treat a highest amount of engine $NO_x$ output. That is to say, the threshold load corresponds to an ammonia load used to treat an engine $NO_x$ output of 100%, wherein 100% engine $NO_x$ output corresponds to engine operating conditions where $NO_x$ output is highest (e.g., a cold-start). Additionally or alternatively, the threshold load may be based on a fixed volume, wherein the fixed volume is equal to a percentage of a total volume of the reservoir (e.g., 90% of the total volume of the reservoir).

At any rate, if the ammonia load is not less than the threshold load, then the method 300 may proceed to 308 to maintain current engine operating parameters and does not adjust exhaust gas conditions to produce ammonia.

If the ammonia load is less than the threshold load, then the method 300 may proceed to 310 to increase operating temperatures and pressure. As described above, the pressure and temperature may be passively increased via utilization of exhaust gas heat. Additionally or alternatively, a pump (e.g., pump 185 of FIG. 2) may be activated, which may increase exhaust gas pressure, and therefore temperature, to a desired operating temperature and pressure. As described above, a desired operating pressure may include a pressure in a range between 5 and 50 bar. Additionally or alternatively, in some embodiments, the desired operating pressure may include a pressure in a range between 15 and 30 bar. Additionally or alternatively, in some embodiments, the desired operating pressure may include a pressure in a range between 20 and 25 bar. In one example, the desired operating pressure is exactly 22 bar. A desired operating temperature may include a temperature in a range between 150 and 450° C. Additionally or alternatively, in some embodiments, the operating temperature may include a temperature in a range between 150 to 350° C. Additionally or alternatively, in some embodiments, the operating temperature may include a temperature in a range between 150 to 250° C. Additionally or alternatively, in some embodiments, the operating temperature may include a temperature in a range between 200 to 250° C. In one example, the operating temperature is exactly 220° C.

The method 300 may proceed to 312, where the method may include determining if the operating temperature and pressure are still less than the threshold temperature and pressure. The operating temperature and pressure may be estimated based on feedback from one or more of an exhaust gas temperature sensor, an exhaust gas mass flow sensor, and an exhaust gas pressure sensor. Additionally or alternatively, the operating temperature and pressure may be calculated based on current engine operating parameters including at least some of the engine operating parameters at 302.

If the operating temperature and pressure are not less than the desired operating pressure temperature, then the method may proceed to 314, where the method 300 may maintain current operating parameters and does not adjust engine operating conditions. That is to say, the exhaust gas conditions are sufficiently adjusted via one or more of the pump and exhaust gas heat such that ammonia may be produced by the device.

The method 300 may proceed to 316, where the method may include replenishing the ammonia load of the ammonia reservoir. In some examples, this may include flowing ammonia to only the reservoir and not to the SCR when replenishing is occurring. Additionally or alternatively, replenishing may further include flowing ammonia to both the SCR and the reservoir when $NO_x$ reduction is desired simultaneously to replenishing being desired. In some examples, the flow of ammonia to the SCR and to the reservoir when $NO_x$ reduction and ammonia replenishing is desired may be based on a current SCR ammonia load and engine $NO_x$ output. Thus, the flow of ammonia to the SCR may increase in response to one or more of the current SCR ammonia load decreasing and the engine $NO_x$ output increasing.

Returning to 312, if the operating temperature and pressure are less than the desired operating temperature and pressure, then the method 300 may proceed to 318 to adjust one or more engine operating conditions including retarding spark at 320, increasing a primary fuel injection pressure at 322, increasing a secondary fuel injection volume at 324, increasing a wastegate opening at 326, increasing a backpressure valve closing at 328, and increasing an amount of condensate swept to the engine 330. Increasing the wastegate opening may be conduction in conjunction with boost demand, wherein the wastegate opening may increase as boost demand decreases. Increasing the backpressure valve (e.g., backpressure valve 173 of FIG. 2) closing may be adjusted in response to a combustion stability, wherein as a likelihood of exhaust gas being drawn into the combustion chamber increases, the closing of the backpressure valve decreases. Decreasing a closed of the backpressure valve may result in a more open backpressure valve position such that more exhaust gas is permitted to flow passed the backpressure valve at a given time point.

Increasing condensate swept to the engine may include sweeping condensate from one or more coolers to the engine. The coolers may include a CAC, EGR cooler, or other similar cooler where condensate may accumulate. An amount of condensate swept to the engine may be based on a combustion stability, wherein the amount of condensate swept increases as the combustion stability increases. Adding water to a combustion mixture may allow water vapor to be present in the exhaust gas, which may increase an exhaust gas pressure. That is to say, by adding water to a combustion mixture having a given air/fuel ratio, the exhaust pressure of the given air/fuel ratio may be increased relative to an exhaust gas pressure of the given air/fuel ratio.

By adjusting one or more engine operating parameters at 318, the method 300 may deliberately decrease fuel economy to allow the device to synthesize ammonia for one or more of the ammonia reservoir and the SCR. The method 300 may continue to monitor if the operating temperature and pressure are greater than or equal to the desired operating temperature follow 318.

In this way, a vehicle may comprise an onboard device configured to synthesize ammonia. The ammonia may be stored in a reservoir or stored in an SCR. The technical effect of arranging a device comprising a catalyst configured to generate ammonia in the presence of nitrogen, air, and water is to eliminate the cumbersome task of refilling a reductant reservoir. By generating the reductant (ammonia) onboard, a vehicle operator may no longer be forced to manually refill the reductant reservoir.

An embodiment of a method comprising operating an exhaust gas aftertreatment device for scrubbing exhaust gas of an internal combustion engine of a motor vehicle, in which ammonia is used for selective catalytic reduction of nitrogen oxides in the exhaust gas, wherein the ammonia is created by means of electrolysis, wherein nanoparticles of iron(III) oxide, which are distributed in a mixture consisting of potassium hydroxide and sodium hydroxide, are used as the catalyst, an electric DC voltage of between 1 V and 48 V is used for the electrolysis, and wherein the electrolysis is carried out at an operating temperature of between 150° C. and 450° C., and at an operating pressure of between 5 bar and 50 bar. A first example of the method, further includes where waste heat of the internal combustion engine is used for heating up to the operating temperature and operating pressure. A second example of the method, optionally including the first example, further includes where the operating pressure is created via a pump. A third example of the method, optionally including the first and/or second examples, further includes where the electric DC voltage is provided via electric energy of an on-board electrical system of the motor vehicle. A fourth example of the method, optionally including one or more of the first through third examples, further includes where ammonia is temporarily stored in a reservoir. A fifth example of the method, optionally including one or more of the first through fourth examples, further includes where creating ammonia via electrolysis further includes addition of water, where the water is obtained from one or more of water vapor from the exhaust gas of the internal combustion engine, rain water, and air moisture.

An embodiment of a system comprising an ammonia generating device comprising nanoparticles of iron(III) oxide, which are distributed in a mixture consisting of potassium hydroxide and sodium hydroxide, as the catalyst, the ammonia generating device further comprising an electrical connection to use an electric DC voltage of between 1 V and 48 V for the electrolysis, and to carry out the electrolysis at an operating temperature of between 150° C. and 450° C. and at an operating pressure of between 5 bar and 50 bar. A first example of the system, optionally including where the electrical connection is to an energy storage device of a hybrid vehicle. A second example of the system, optionally including the first example, further includes where the DC voltage is between 1 and 2 V, the operating temperature is between 200 and 250° C., and the operating pressure is between 20 to 25 bar. A third example of the system, optionally including the first and/or second examples, further includes where the ammonia generating device is coupled to a selective reduction catalyst arranged in an exhaust passage configured to receive exhaust gas from an engine, and where the ammonia generating device is further coupled to an ammonia reservoir, and where the ammonia generating device directs ammonia produced therein to the ammonia reservoir when the selective reduction catalyst does not demand ammonia. A fourth example of the system, optionally including one or more of the first through third examples, further includes where the ammonia generating device receives at least some exhaust gas energy before the selective catalytic reduction device in response to a demand to produce ammonia.

An embodiment of a method comprises adjusting one or more engine operating parameters to adjust a current exhaust gas temperature and pressure to a desired exhaust gas temperature and pressure to catalytically produce ammonia in an ammonia generating device in response to an ammonia demand. A first example of the method further includes where the ammonia demand is from one or more of a selective reduction device and a reservoir, wherein each of the selective reduction device and the reservoir are fluidly coupled to the ammonia generating device. A second example of the method, optionally including the first example, further includes where the reservoir directs ammonia to the selective reduction device when conditions for generating ammonia in the ammonia generating device are not met. A third example of the method, optionally including the first and/or second examples, further includes where adjusting one or more engine operating parameters includes adjusting one or more of a spark timing, a fuel injection pressure, a fuel injection volume, a wastegate position, a backpressure valve position, and an amount of condensate swept to the engine. A fourth example of the method, optionally including one or more of the first through third examples, further includes where diverting a portion of exhaust gas from an engine directly to the ammonia generating device before flowing the exhaust gas to a selective catalytic reduction device. A fifth example of the method, optionally including one or more of the first through fourth examples, further includes where the ammonia generating device is electrically coupled to an energy storage device and receives between 1 to 5 V when ammonia production is desired. A sixth example of the method, optionally including one or more of the first through fifth examples, further includes where adjusting a current exhaust gas pressure further includes activating a pump of the ammonia generating device. A seventh example of the method, optionally including one or more of the first through sixth examples, further includes where the ammonia generating device comprises Fe in the form of $Fe_2O_3$, $Fe_3O_4$, or FeO. An eighth example of the method, optionally including one or more of the first through seventh examples, further includes where the ammonia generating device comprises a catalyst comprising Fe, Os, Ru, and Ur.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    operating an exhaust gas aftertreatment device for scrubbing exhaust gas of an internal combustion engine of a motor vehicle, in which ammonia is used for selective catalytic reduction of nitrogen oxides in the exhaust gas, wherein the ammonia is replenished via electrolysis when an ammonia load in an ammonia reservoir is less than a threshold load, wherein nanoparticles of iron(III) oxide, which are distributed in a mixture consisting of potassium hydroxide and sodium hydroxide, are used as a catalyst, an electric DC voltage of between 1 V and 48 V is used for the electrolysis, and wherein the electrolysis is carried out at an operating temperature of between 150° C. and 450° C., and at an operating pressure of between 5 bar and 50 bar, the ammonia created at an ammonia generating device of the exhaust gas aftertreatment device, the method further comprising increasing an exhaust gas temperature and pressure to a desired exhaust gas temperature and desired exhaust gas pressure via a pump and exhaust gas heat, respectively, to catalytically produce the ammonia in the ammonia generating device in response to an ammonia demand, wherein the exhaust gas heat is waste heat of the internal combustion engine and is used for heating up the ammonia generating device to the operating temperature and for providing the operating pressure, and adjusting engine conditions if the exhaust gas temperature and pressure continue below the desired exhaust gas temperature and the desired exhaust gas temperature, wherein when the ammonia load is not less than the threshold load, the engine conditions are maintained.

2. The method of claim 1, wherein water vapor is produced by the waste heat in order to provide the operating pressure.

3. The method of claim 1, wherein the electric DC voltage is provided via electric energy of an on-board electrical system of the motor vehicle.

4. The method of claim 1, wherein the ammonia is temporarily stored in a reservoir.

5. The method of claim 1, wherein creating the ammonia via electrolysis further includes addition of water, where the water is obtained from one or more of water vapor from the exhaust gas of the internal combustion engine, rain water, and air moisture.

6. A system comprising:
    an ammonia generating device comprising nanoparticles of iron (III) oxide, which are distributed in a mixture consisting of potassium hydroxide and sodium hydroxide, as a catalyst, the ammonia generating device further comprising an electrical connection to use an electric DC voltage of between 1 V and 48 V for electrolysis, and to carry out the electrolysis at an operating temperature of between 150° C. and 450° C. and at an operating pressure of between 5 bar and 50 bar; an engine; a pump; and
    a controller with instructions for determining an ammonia load in an ammonia reservoir, and when the ammonia load is less than a threshold load, increasing an exhaust gas temperature of the engine and an exhaust gas pressure of the engine via the pump and exhaust gas heat to a desired exhaust gas temperature and a desired exhaust gas pressure, respectively, to catalytically produce ammonia in the ammonia generating device in response to an ammonia demand, wherein the exhaust gas heat is waste heat of the engine and is used for heating up the ammonia generating device to the operating temperature and for providing the operating pressure, adjusting engine conditions if the exhaust gas temperature and the exhaust gas pressure continues below the desired exhaust gas temperature and the desired exhaust gas pressure, and when the ammonia load is not less than the threshold load, maintaining engine operating conditions.

7. The system of claim 6, wherein the electrical connection is to an energy storage device of a hybrid vehicle.

8. The system of claim 6, wherein the DC voltage is between 1 V and 2 V, the operating temperature is between 200° C. and 250° C., and the operating pressure is between 20 bar and 25 bar.

9. The system of claim 6, wherein the ammonia generating device is coupled to a selective reduction catalyst arranged in an exhaust passage configured to receive exhaust gas from the engine, and wherein the ammonia generating device is further coupled to an ammonia reservoir, where the ammonia generating device directs the ammonia produced therein to the ammonia reservoir when the selective reduction catalyst does not demand ammonia.

10. The system of claim 6, wherein the ammonia generating device is thermally coupled to the engine and is not fluidly coupled to the engine.

11. A method comprising:
adjusting one or more engine operating parameters to increase a current exhaust gas temperature and a current exhaust gas pressure to a desired exhaust gas temperature and a desired exhaust gas pressure to generate an operating pressure with waste exhaust gas heat via water vapor generation, the generated operating pressure to catalytically produce ammonia via nanoparticles of a metal oxide in an ammonia generating device when an ammonia load in an ammonia reservoir is less than a threshold load; and maintaining engine operating parameters when the ammonia load is not less than the threshold load.

12. The method of claim 11, wherein the threshold load is an amount of ammonia demanded by one or more of a selective reduction device and the reservoir, and wherein each of the selective reduction device and the reservoir are fluidly coupled to the ammonia generating device.

13. The method of claim 12, wherein the reservoir directs ammonia to the selective reduction device when conditions for generating ammonia in the ammonia generating device are not met.

14. The method of claim 11, wherein adjusting the one or more engine operating parameters includes adjusting one or more of a spark timing, a fuel injection timing, a fuel injection pressure, a fuel injection volume, a wastegate position, a backpressure valve position, and an amount of condensate swept to the engine.

15. The method of claim 12, further comprising flowing air to the ammonia generating device in response to the amount of ammonia demand.

16. The method of claim 11, wherein the ammonia generating device is electrically coupled to an energy storage device and receives between 1 V and 5 V when ammonia production is desired.

17. The method of claim 11, wherein increasing the current exhaust gas pressure further includes activating a pump of the ammonia generating device.

18. The method of claim 11, wherein the ammonia generating device comprises Fe in the form of $Fe_2O_3$, $Fe_3O_4$, or FeO.

19. The method of claim 11, wherein the metal oxide is a metal oxide of Fe, Os, Ru, or Ur.

* * * * *